US011333167B2

(12) United States Patent
Okada et al.

(10) Patent No.: US 11,333,167 B2
(45) Date of Patent: May 17, 2022

(54) METHOD OF DESIGNING BLADE OF AXIAL FLOW FLUID MACHINE AND BLADE

(71) Applicant: IHI CORPORATION, Koto-ku (JP)

(72) Inventors: Ryuichi Okada, Koto-ku (JP); Tomonori Enoki, Koto-ku (JP); Takeshi Murooka, Koto-ku (JP); Dai Kato, Koto-ku (JP)

(73) Assignee: IHI CORPORATION, Koto-ku (JP)

( * ) Notice: Subject to any disclaimer, the term of this patent is extended or adjusted under 35 U.S.C. 154(b) by 93 days.

(21) Appl. No.: 16/587,456

(22) Filed: Sep. 30, 2019

(65) Prior Publication Data

US 2020/0173457 A1    Jun. 4, 2020

Related U.S. Application Data

(63) Continuation of application No. PCT/JP2017/039383, filed on Oct. 31, 2017.

(30) Foreign Application Priority Data

Apr. 17, 2017    (JP) .............................. JP2017-081386

(51) Int. Cl.
*F01D 5/14*    (2006.01)
*F04D 29/38*   (2006.01)

(52) U.S. Cl.
CPC .......... *F04D 29/384* (2013.01); *F01D 5/141* (2013.01)

(58) Field of Classification Search
CPC ... F04D 29/384; F01D 5/141; F05D 2240/303
See application file for complete search history.

(56) References Cited

U.S. PATENT DOCUMENTS 9,453,416 B2    9/2016 Lung et al.
10,344,771 B2 *  7/2019 Lukowski ............... F01D 5/143
(Continued)

FOREIGN PATENT DOCUMENTS

CN    102996511 B    4/2015
JP    2013-3971 A     1/2013
(Continued)

OTHER PUBLICATIONS

International Search Report dated Jan. 16, 2018 in PCT/JP2017/039383, filed on Oct. 31, 2017 (with English translation).
(Continued)

*Primary Examiner* — Sabbir Hasan
(74) *Attorney, Agent, or Firm* — Oblon, McClelland, Maier & Neustadt, L.L.P.

(57) ABSTRACT

To provide a method of designing a blade of an axial flow fluid machine that has a blade surface whose radius of curvature is continuous at a leading edge thereof and has a high aerodynamic performance. The method includes a step of determining a pressure surface curve and a suction surface curve as curves capable of first to third order differentiations at respective connection points to a leading edge curve, that is, a pressure surface connection point and a suction surface connection point, and a step of forming the leading edge curve as a fifth order Bezier curve that is defined by a first control point, a second control point, a third control point, a fourth control point, a fifth control point and a sixth control point. The first control point is the suction surface connection point. The sixth control point is the pressure surface connection point. Provided that an intersection of a tangent to the pressure surface curve at the pressure surface connection point and a tangent to the suction surface curve at the suction surface connection point is referred to as a point ahead of the blade, the second and
(Continued)

fifth control points are points that internally divide line segments connecting the point ahead of the blade to the suction surface connection point and the pressure surface connection point, respectively. The third and fourth control points are points having coordinates that are determined as solutions of simultaneous equations obtained by applying continuity conditions for first to third differential coefficients at the first and sixth control points to a fifth order Bezier function.

1 Claim, 6 Drawing Sheets

(56) References Cited

U.S. PATENT DOCUMENTS

| | | | | |
|---|---|---|---|---|
| 10,417,378 | B2* | 9/2019 | Verbrugge | G06F 30/15 |
| 2009/0104023 | A1* | 4/2009 | Favray | F02C 6/12 |
| | | | | 415/160 |
| 2011/0202321 | A1 | 8/2011 | Lung et al. | |
| 2016/0162629 | A1 | 6/2016 | Verbrugge et al. | |
| 2017/0023003 | A1 | 1/2017 | Lukowski | |

FOREIGN PATENT DOCUMENTS

| | | |
|---|---|---|
| JP | 2016-525756 A | 8/2016 |
| JP | 2017-505399 A | 2/2017 |

OTHER PUBLICATIONS

Extended European Search Report dated Nov. 27, 2020 in corresponding European Patent Application No. 17906118.9 citing document AO therein, 9 pages.

* cited by examiner

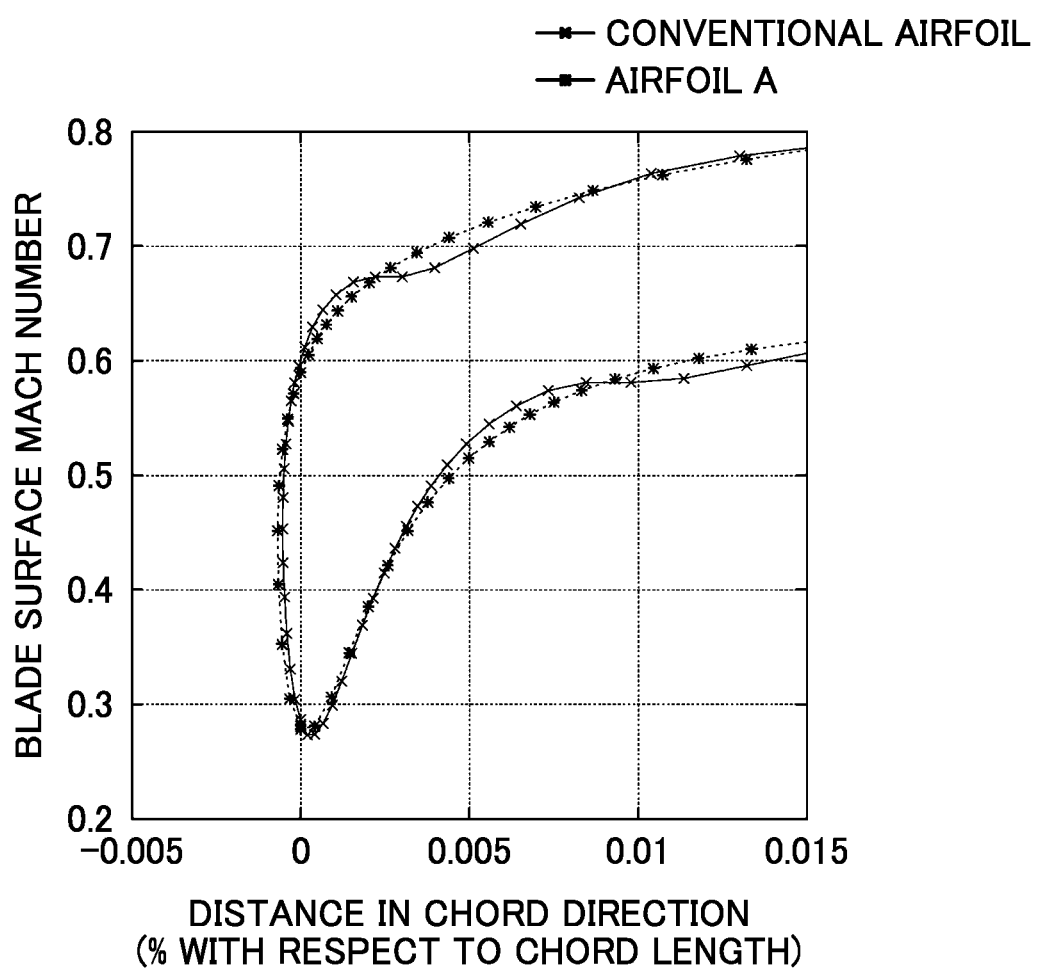

METHOD OF DESIGNING BLADE OF AXIAL FLOW FLUID MACHINE AND BLADE

TECHNICAL FIELD

Embodiments described herein relate to a method of designing a blade (a rotor blade and a stator vane) of an axial flow fluid machine such as a fan or a compressor, and to the blade.

BACKGROUND ART

The airfoil (cross-sectional shape) of a blade (a rotor blade and a stator vane) of an axial flow fluid machine, such as a fan or a compressor, is formed by a leading edge, a trailing edge, and a concave pressure surface and a convex suction surface that extend between the edges.

In design of a conventional airfoil, the leading edge and the trailing edge are often shaped as a simple curve connecting the pressure surface and the suction surface, such as a circular or elliptic arc, whereas the pressure surface and the suction surface are specifically determined in various methods such as those using computational fluid dynamics (CFD).

However, in the airfoil thus designed, radius of curvature of the blade surface is discontinuous (or in other words, the curvature sharply changes) at connections between the edges and the pressure surface and suction surface, and the flow accelerates or decelerates at the connections. Such a phenomenon can lead to a decrease in aerodynamic performance of the blade, which can lead to a decrease in efficiency or a reduction of a stable operating range of the axial flow fluid machine incorporating the blade. The effect of the phenomenon is particularly marked at the leading edge, which is located on the upstream side of the flow.

To prevent the radius of curvature of the blade surface from being discontinuous as described above, various airfoil designing methods have been proposed (for example, Patent Documents 1 and 2).

As a technique for drawing a smooth curve, it is known to use a Bezier curve. The Bezier curve can be reshaped in various ways by displacing control points number of which depends on the order of the Bezier curve. Therefore, the Bezier curve is useful for drawing a large number of candidate curves (for example, in a computer-aided manner) from which an optimal curve is selected, and is widely used particularly in the field of industrial design.

Also in the field of design of the airfoil, attempts have been made to use the Bezier curve. For example, Patent Document 3 proposes a method of optimizing an airfoil by drawing an existing airfoil (such as an NACA airfoil) as a Bezier curve and then reshaping the Bezier curve in various ways.

The Bezier curve is an (N−1)-th order curve defined by N control points (N denotes the order of the Bezier curve). In the field of industrial design, a second or third order Bezier curve is often used. For example, a fifth order Bezier curve, which will be described later, can be drawn in the following manner (see FIG. 7).

(1) Control points X1, X2, X3, X4, X5 and X6 of the Bezier curve are selected (the fifth order Bezier curve has six control points). The control points X1 and X6 are end points of the Bezier curve.

(2) Points X7, X8, X9, X10 and X11 that internally divide the five line segments X1X2, X2X3, X3X4, X4X5 and X5X6 obtained by connecting the six control points with a ratio of t to (1−t), respectively, are determined.

(3) Points X12 . . . that internally divide again the line segments connecting the points determined in (2) with a ratio of t to (1−t) are determined.

(4) The same operation is repeated, and a point (X21) finally obtained is adopted as a point on the determined Bezier curve.

(5) The fifth order Bezier curve (shown as a dotted line) is obtained by repeating the operations (2) to (4) in the range of 0<t<1.

The Bezier curve thus drawn has a property that the line segment connecting an end point and the control point adjacent to the end point is a tangent at the end point (in the example shown in FIG. 7, the line segments X1X2 and X5X6 are tangents at the end points X1 and X6, respectively).

Therefore, in designing the airfoil, if a Bezier curve is drawn based on the forward end points (connections to the leading edge) of the pressure surface and the suction surface and control points on the tangents to the pressure surface and the suction surface at these points, and the leading edge is formed by the Bezier curve, the slopes of the tangents to the curves forming the blade surface at the connections between the leading edge and the pressure surface and the suction surface can be made continuous (in other words, the curves are not angled at the connections).

RELATED ART DOCUMENT

Patent Document

Patent Document 1: U.S. Patent Application Publication No. 2011/0202321
Patent Document 2: U.S. Pat. No. 9,453,416
Patent Document 3: Japanese Patent Laid-Open No. 2013-3971

SUMMARY OF THE DISCLOSURE

Problems to be Solved by the Disclosure

However, to solve the problems with the conventional airfoil described above, the continuity of only the slopes of the tangents to the curve of the leading edge at the connections to the pressure surface and the suction surface is not sufficient, but continuity of also the radius of curvature is necessary. On the other hand, the continuity of the radius of curvature at the connections is a necessary condition for optimization of the aerodynamic performance of the blade but is not a sufficient condition.

That is, even when the leading edge of the airfoil is formed as a Bezier curve, an enormous number of Bezier curves need to be drawn and individually evaluated in terms of aerodynamic performance of the blade to which the Bezier curve is applied, in order to optimize the aerodynamic performance of the blade.

However, although the Bezier curve can be reshaped in various ways by displacing the control points, the Bezier curve has another characteristic that a desired shape cannot be obtained if the control points are not appropriately selected. Therefore, it is extremely difficult to select a Bezier curve that provides the optimal aerodynamic performance of the blade from the Bezier curves drawn based on the control points selected by trial and error.

For this reason, in forming the leading edge of the airfoil as a Bezier curve, there is a demand for a method of systematically selecting the control points of the Bezier curve so that an optimal aerodynamic performance of the blade is achieved.

The present disclosure is made in view of the problems described above, and an object of the present disclosure is to provide a method of efficiently designing a blade of an axial flow fluid machine that has a blade surface whose radius of curvature is continuous at a leading edge thereof and has a high aerodynamic performance, and a blade of an axial flow fluid machine designed in the same method.

Means for Solving the Problems

In order to solve the problems described above, a method of designing a blade according to the present disclosure is a method to be applied to a blade having an airfoil that is formed by a leading edge curve, a trailing edge curve, a pressure surface curve and a suction surface curve, the method comprising:

(A) a step of determining the pressure surface curve as a curve capable of first to third order differentiations at a connection point to the leading edge curve, that is, a pressure surface connection point;

(B) a step of determining the suction surface curve as a curve capable of first to third order differentiations at a connection point to the leading edge curve, that is, a suction surface connection point; and (C) a step of selecting a first control point, a second control point, a third control point, a fourth control point, a fifth control point and a sixth control point that define a fifth order Bezier curve forming the leading edge curve, the step comprising:

(C-1) a sub-step of designating the suction surface connection point as the first control point;

(C-2) a sub-step of designating the pressure surface connection point as the sixth control point;

provided that an intersection of a tangent to the pressure surface curve at the pressure surface connection point and a tangent to the suction surface curve at the suction surface connection point is referred to as a point ahead of the blade, (C-3) a sub-step of designating, as the second control point, a point that internally divides a line segment connecting the point ahead of the blade and the suction surface connection point with a ratio of p to (1−p) (where 0<p<1);

(C-4) a sub-step of designating, as the fifth control point, a point that internally divides a line segment connecting the point ahead of the blade and the pressure surface connection point with a ratio of q to (1−q) (where 0<q<1); and (C-5) a sub-step of designating, as the third control point and the fourth control point, points having coordinates that are determined as solutions of simultaneous equations obtained by applying continuity conditions for first to third differential coefficients at the first control point and the sixth control point to a fifth order Bezier function that defines the fifth order Bezier curve.

A blade according to the present disclosure has an airfoil that is formed by a leading edge curve, a trailing edge curve, a pressure surface curve and a suction surface curve, the pressure surface curve is a curve that is connected to the leading edge curve at a pressure surface connection point and whose first to third order differential coefficients at the pressure surface connection point are known, the suction surface curve is a curve that is connected to the leading edge curve at a suction surface connection point and whose first to third order differential coefficients at the suction surface connection point are known;

the leading edge curve is formed as a fifth order Bezier curve, the fifth order Bezier curve is defined by a first control point, a second control point, a third control point, a fourth control point, a fifth control point and a sixth control point, the first control point coincides with the suction surface connection point, the sixth control point coincides with the pressure surface connection point, provided that an intersection of a tangent to the pressure surface curve at the pressure surface connection point and a tangent to the suction surface curve at the suction surface connection point is referred to as a point ahead of the blade, the second control point is a point that internally divides a line segment connecting the point ahead of the blade and the suction surface connection point with a ratio of p to (1−p) (where 0<p<1), the fifth control point is a point that internally divides a line segment connecting the point ahead of the blade and the pressure surface connection point with a ratio of q to (1−q) (where 0<q<1), and the third control point and the fourth control point are points having coordinates that are determined as solutions of simultaneous equations obtained by applying continuity conditions for first to third differential coefficients at the first control point and the sixth control point to a fifth order Bezier function that defines the fifth order Bezier curve.

Effects of the Disclosure

With the blade according to the present disclosure, since the leading edge of the airfoil is formed as a Bezier curve, and the Bezier curve is defined so that the first to third differential coefficients are continuous at the connection points to the curves forming the pressure surface and the suction surface, the radius of curvature of the blade surface can be made continuous at the connections of the leading edge to the pressure surface and the suction surface, and the aerodynamic performance of the blade can be improved.

With the blade according to the present disclosure, although the order of the Bezier curve forming the leading edge of the airfoil is the fifth order, by applying the continuity conditions for the first to third differential coefficients described above, the number of unknown quantities is significantly reduced, and the control points of the Bezier curve can be determined using only two variables. Therefore, compared with the case where control points selected by trial and error are used, a Bezier curve having a desired shape can be quickly determined, and the design productivity can be improved. In addition, since the two variables remain as unknown quantities, the degree of freedom of the design of the airfoil is ensured.

BRIEF DESCRIPTION OF THE DRAWINGS

FIG. 5B is a graph showing a distribution of the blade surface Mach number at a design point in a region around the leading edge (the region surrounded by the dashed line in FIG. 5A);

MODE FOR CARRYING OUT THE DISCLOSURE

In the following, an embodiment of the present disclosure will be described in detail with reference to the drawings.

Figure 1:
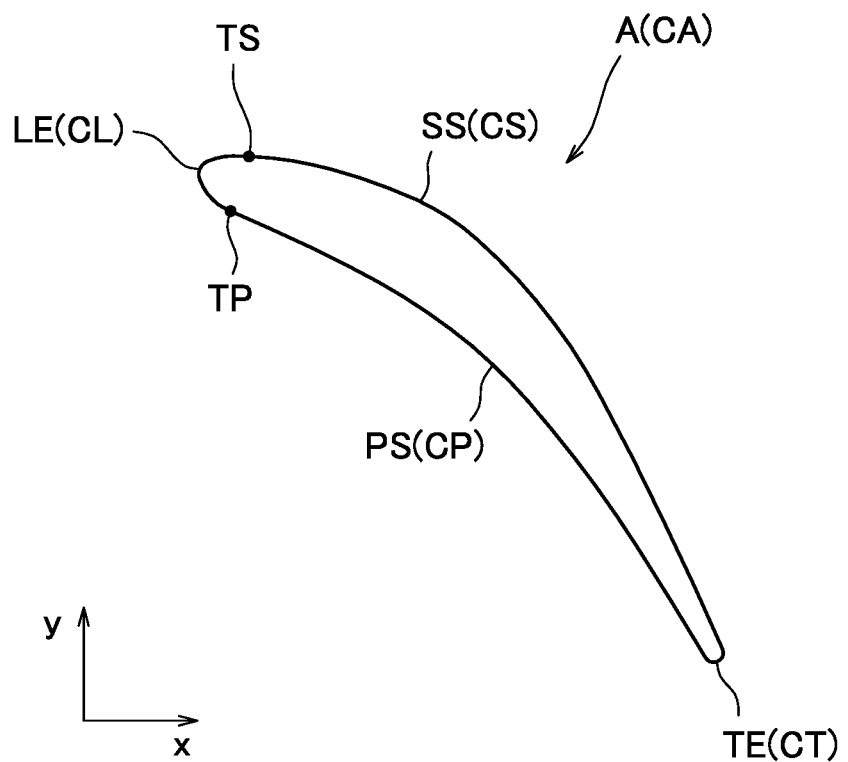
FIG. 1 is a schematic diagram for illustrating an airfoil of a blade according to an embodiment of the present disclosure.

FIG. 1 is a schematic diagram for illustrating an airfoil of a blade according to an embodiment of the present disclosure.

An airfoil A of a blade according to an embodiment of the present disclosure is formed by a leading edge LE, a trailing edge TE, and a concave pressure surface PS and a convex suction surface SS that extend between the edges.

In the following, curves forming the leading edge LE, the trailing edge TE, the pressure surface PS and the suction surface SS will be referred to as a leading edge curve CL, a trailing edge curve CT, a pressure surface curve CP, and a suction surface curve CS, respectively, and a closed curve formed by these four curves or, in other words, a curve forming the airfoil A will be referred to as an airfoil curve CA.

In the airfoil A of the blade according to the embodiment of the present disclosure, the pressure surface curve CP and the suction surface curve CS are curves capable of first to third order differentiations at a pressure surface connection point TP and a suction surface connection point TS both described later, respectively, and have shapes independently determined in a process using CFD, for example. The trailing edge curve CT can be a circular or elliptic arc. The leading edge curve CL is formed as a Bezier curve.

In the following, a process of determining the shape of the Bezier curve adopted as the leading edge curve CL will be described.

First, a Bezier function that defines a Bezier curve is expressed by the formula (1).

$$P(t) = \sum_{i=0}^{N} X_{j+1} J_{n,i}(t) \quad (1)$$
$$0 \leq t \leq 1$$

In this formula, N denotes the order of the Bezier function, X denotes the coordinates of a control point, and J denotes a Bernstein basis function defined by the formula (2).

$$J_{n,i}(t) = \binom{n}{i} t^i (1-t)^{n-i} \quad (2)$$

-continued
$$\binom{n}{i} = \frac{n!}{i!(n-i)!}$$

The Bezier curve (leading edge curve CL) to be determined is connected to the pressure surface curve CP and the suction surface curve CS at the pressure surface connection point TP and the suction surface connection point TS, respectively. In order for the radius of curvature of the airfoil curve CA at each of these connection points to be continuous, the following boundary conditions need to be satisfied.

(1) A continuity condition for the first order differential coefficient (first order differential coefficients (dy/dx) on opposite sides of each connection point are equal to each other).

(2) A continuity condition for the second order differential coefficient (second order differential coefficients ($d^2y/dx^2$) on opposite sides of each connection point are equal to each other).

The discontinuity in radius of curvature of the conventional airfoil whose leading edge curve is a simple curve such as a circular or elliptic arc that occurs at each of the connection point between the leading edge curve and the pressure surface curve and the connection point between the leading edge curve and the suction surface curve is resolved if the boundary conditions (1) and (2) described above are satisfied.

Furthermore, according to the boundary layer equation, it is known to be desirable from the viewpoint of aerodynamic performance of the blade that (3) A continuity condition for the third order differential coefficient (third order differential coefficients ($d^3y/dx^3$) on opposite sides of each connection point are equal to each other) is satisfied on the blade surface.

Thus, in determining the shape of the Bezier curve for the airfoil A of the blade according to the embodiment of the present disclosure, all the boundary conditions (1) to (3) described above are imposed.

First, to obtain the Bezier curve that satisfies the boundary conditions described above, what order the Bezier curve should be of will be discussed.

Here, a third order Bezier curve has four control points, and a fifth order Bezier curve has six control points. Two of the control points are end points of the Bezier curve, that is, the pressure surface connection point TP and the suction surface connection point TS, and the coordinates of the two control points are known. Therefore, the third order Bezier curve has four unknown quantities (the x coordinate and the y coordinate of the two control points other than the end points), and the fifth order Bezier curve has eight unknown quantities (the x coordinate and the y coordinate of the four control points other than the end points).

As can be seen from the above description, when a high order Bezier curve is used, a large number of unknown quantities need to be handled, and the computational complexity is high.

Figure 2:
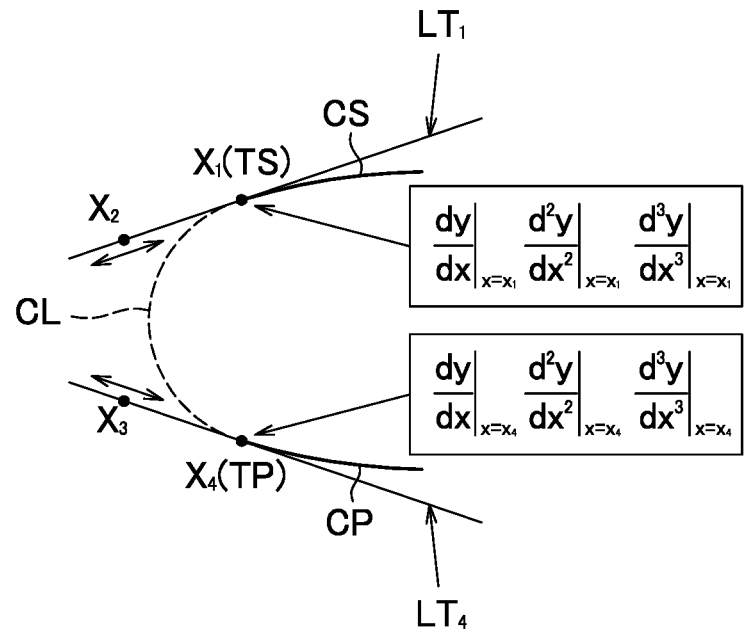
FIG. 2 is a diagram for illustrating boundary conditions in a case where a third order Bezier curve is applied to a leading edge of the airfoil shown in FIG. 1.

In view of this, first, whether the third order Bezier curve can be applied is examined. For the third order Bezier curve, as shown in FIG. 2, four control points $X_1$, $X_2$, $X_3$ and $X_4$ are used. Of these control points, the control points $X_1$ and $X_4$ are the suction surface connection point TS and the pressure surface connection point TP in FIG. 1, respectively.

The formula (1) can be rewritten for the third order Bezier function as follows.

$$P(t) = \binom{3}{0}X_1 t^0 (1-t)^3 + \binom{3}{1}X_2 t^1 (1-t)^2 + \binom{3}{2}X_3 t^2 (1-t)^1 + \binom{3}{3}X_4 t^3 (1-t)^0 \quad (3)$$

$$P(t) = X_1(1 - 3t + 3t^2 - t^3) + 3X_2(t - 2t^2 + t^3) + 3X_3(t^2 - t^3) + X_4 t^3 = \quad (4)$$
$$X_1 + (-3X_1 + 3X_2)t + (3X_1 - 6X_2 + 3X_3)t^2 + (-X_1 + 3X_2 - 3X_3 + X_4)t^3$$

The function P(t) is differentiated with respect to a parameter t as follows.

$$\dot{P}(t) = (-3X_1 + 3X_2) + 2(3X_1 - 6X_2 + 3X_3)t + 3(-X_1 + 3X_2 - 3X_3 + X_4)t^2 \quad (5)$$

This can be rewritten as follows.

$$\frac{dy}{dx} = \frac{\dot{y}}{\dot{x}} = \frac{(-3y_1 + 3y_2) + 2(3y_1 - 6y_2 + 3y_3)t + 3(-y_1 + 3y_2 - 3y_3 + y_4)t^2}{(-3x_1 + 3x_2) + 2(3x_1 - 6x_2 + 3x_3)t + 3(-x_1 + 3x_2 - 3x_3 + x_4)t^2} \quad (6)$$

At the end point $X_1$ (t=0) and the end point $X_4$ (t=1), the following relations hold.

$$\left.\frac{dy}{dx}\right|_{x=x_1} = \frac{-y_1 + y_2}{-x_1 + x_2} \quad (7)$$

$$\left.\frac{dy}{dx}\right|_{x=x_4} = \frac{-y_3 + y_4}{-x_3 + x_4} \quad (8)$$

The formulas (7) and (8) show that the continuity condition for the first order differential coefficient (boundary condition (1)) is satisfied if the control point $X_2$ is set on a tangent at the end point $X_1$, that is, a suction surface tangent $LT_1$, and the control point $X_3$ is set on a tangent at the end point $X_4$, that is, a pressure surface tangent $LT_4$.

By setting the control points $X_2$ and $X_3$ as described above, the number of unknown quantities decreases from four to two. However, in order to satisfy the continuity condition for the second order differential coefficient (boundary condition (2)) and the continuity condition for the third order differential coefficient (boundary condition (3)), at least four unknown quantities are required at this stage. This means that the order of the third order Bezier function is insufficient, and the third order Bezier curve cannot be applied.

Figure 3:
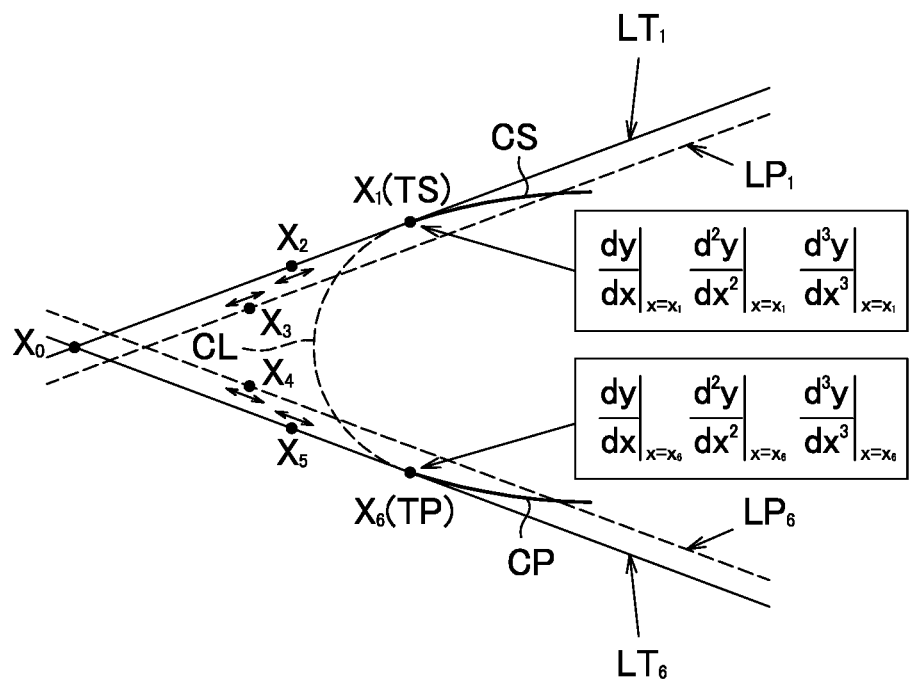
FIG. 3 is a diagram for illustrating boundary conditions in a case where a fifth order Bezier curve is applied to a leading edge of the airfoil shown in FIG. 1.

Thus, the fifth order Bezier curve is applied. For the fifth order Bezier curve, as shown in FIG. 3, six control points $X_1$, $X_2$, $X_3$, $X_4$, $X_5$ and $X_6$ are used. Of these control points, the control points $X_1$ and $X_6$ are the suction surface connection point TS and the pressure surface connection point TP in FIG. 1, respectively.

The formula (1) can be rewritten for the fifth order Bezier function as follows.

$$P(t) = \binom{5}{0}X_1 t^0 (1-t)^5 + \binom{5}{1}X_2 t^1 (1-t)^4 + \binom{5}{2}X_3 t^2 (1-t)^3 + \binom{5}{3}X_4 t^3 (1-t)^2 + \binom{5}{4}X_5 t^4 (1-t)^1 + \binom{5}{5}X_6 t^5 (1-t)^0 \quad (9)$$

$$P(t) = X_1(1 - 5t + 10t^2 - 10t^3 + 5t^4 - t^5) + 5X_2 t(1 - 4t + 6t^2 - 4t^3 + t^4) + 10X_3 t^2 (1 - 3t + 3t^2 - t^3) + 10X_4 t^3 (1 - 3t + 3t^2 - t^3) + 5X_5 t^4 (1-t) + X_6 t^5 \quad (10)$$
$$= X_1 + (-5X_1 + 5X_2)t + (10X_1 - 20X_2 + 10X_3)t^2 + (-10X_1 + 30X_2 - 30X_3 + 10X_4)t^3 + (5X_1 - 20X_2 + 30X_3 - 20X_4 + 5X_5)t^4 + (-X_1 + 5X_2 - 10X_3 + 10X_4 - 5X_5 + X_6)t^5$$

The formulas (9) and (10) are functions that express the pressure surface curve CP in FIG. 3. This is because the sign of the radius of curvature depends on how the parameter of a parametric function is taken. The suction surface curve CS can be expressed by the following two formulas.

$$P(t) = \binom{5}{0}X_6 t^0 (1-t)^5 + \binom{5}{1}X_5 t^1 (1-t)^4 + \binom{5}{2}X_4 t^2 (1-t)^3 + \binom{5}{3}X_3 t^3 (1-t)^2 + \binom{5}{4}X_2 t^4 (1-t)^1 + \binom{5}{5}X_1 t^5 (1-t)^0 \quad (11)$$

$$P(t) = X_6(1 - 5t + 10t^2 - 10t^3 + 5t^4 - t^5) + 5X_5 t(1 - 4t + 6t^2 - 4t^3 + t^4) + 10X_4 t^2 (1 - 3t + 3t^2 - t^3) + 10X_3 t^3 (1 - 3t + 3t^2 - t^3) + 5X_2 t^4 (1-t) + X_1 t^5 \quad (12)$$
$$= X_6 + (-5X_6 + 5X_5)t + (10X_6 - 20X_5 + 10X_4)t^2 + (-10X_6 + 30X_5 - 30X_4 + 10X_3)t^3 + (5X_6 - 20X_5 + 30X_4 - 20X_3 + 5X_2)t^4 + (-X_6 + 5X_5 - 10X_4 + 10X_3 - 5X_2 + X_1)t^5$$

Here, at the end point $X_6$, the following relation is obtained by substituting 1 to t in the formula (10).

$$\left.\frac{dy}{dx}\right|_{x=x_6} = \frac{dy/dt}{dx/dt} = \frac{-5y_6 + 5y_5}{-5x_6 + 5x_5} = \frac{-y_6 + y_5}{-x_6 + x_5} \quad (13)$$

At the end point $X_1$, the following relation is obtained by substituting 1 to t in the formula (12).

$$\left.\frac{dy}{dx}\right|_{x=x_1} = \frac{dy/dt}{dx/dt} = \frac{-5y_2 + 5y_1}{-5x_2 + 5x_1} = \frac{-y_2 + y_1}{-x_2 + x_1} \quad (14)$$

As in the case of the third order Bezier function, the formulas (13) and (14) show that the continuity condition for the first order differential coefficient (boundary condition (1)) is satisfied if the control point $X_2$ is set on a tangent at the end point $X_1$, that is, a suction surface tangent $LT_1$, and the control point $X_5$ is set on a tangent at the end point $X_6$, that is, a pressure surface tangent $LT_6$.

Next, the continuity condition for the second order differential coefficient (boundary condition (2)) will be examined.

Here, it is assumed that the suction surface tangent $LT_1$ and the pressure surface tangent $LT_6$ intersect with each other at a point $X_0$ ahead of the blade, a point that internally divides the line segment $X_0 X_1$ with a ratio of (1−p) to p is designated as the control point $X_2$, and a point that internally divides the line segment $X_0 X_6$ with a ratio of (1−q) to q is designated as the control point $X_5$ (where 0<p<1, 0<q<1).

The second order differential coefficient at the end point $X_1$ is expressed by the following formula.

$$\left.\frac{d^2y}{dx^2}\right|_{x=x_1} = \left.\frac{\ddot{y}\dot{x} - \dot{y}\ddot{x}}{\dot{x}^3}\right|_{x=x_1} \tag{15}$$

In this formula, the following relations hold.

$$\ddot{x}|_{x=x_1} = 20x_3 - 40x_2 + 20x_1 \tag{16}$$

$$\ddot{y}|_{x=x_1} = 20y_3 - 40y_2 + 20y_1 \tag{17}$$

$$\dot{x}|_{x=x_1} = -5x_2 + 5x_1 \tag{18}$$

$$\dot{y}|_{x=x_1} = -5y_2 + 5y_1 \tag{19}$$

However, the coordinates of the control point $X_2$ depends on the parameter p and therefore can be regarded as constants.

Here, substituting the formulas (16) to (19) into the formula (15) results in the following formulas.

$$\left.\frac{d^2y}{dx^2}\right|_{x=x_1} \dot{x}^3\Big|_{x=x_1} = \tag{20}$$
$$(20y_3 - 40y_2 + 20y_1)\dot{x}|_{x=x_1} - (20x_3 - 40x_2 + 20x_1)\dot{y}|_{x=x_1}$$

$$y_3 = \frac{\dot{y}|_{x=x_1}}{\dot{x}|_{x=x_1}}x_3 + \frac{1}{20\dot{x}|_{x=x_2}}\left\{\left.\frac{d^2y}{dx^2}\right|_{x=x_1}\dot{x}^3\Big|_{x=x_1}\right. \tag{21}$$
$$\left. -20(\dot{x}|_{x=x_1}y_1 - \dot{y}|_{x=x_1}x_1) + 40(\dot{x}|_{x=x_1}y_2 - \dot{y}|_{x=x_2}x_2)\right\}$$

The formula (21) shows that, in FIG. 3, the control point $X_3$ must lie on a straight line $LP_1$ that is parallel to the suction surface tangent $LT_1$.

Calculating the second order differential coefficient at the end point $X_6$ in the same manner results the following.

$$\left.\frac{d^2y}{dx^2}\right|_{x=x_6}\dot{x}^3\Big|_{x=x_6} = \tag{22}$$
$$(20y_4 - 40y_5 + 20y_6)\dot{x}|_{x=x_6} - (20x_4 - 40x_5 + 20x_6)\dot{y}|_{x=x_6}$$

$$y_4 = \frac{\dot{y}|_{x=x_6}}{\dot{x}|_{x=x_6}}x_4 + \frac{1}{20\dot{x}|_{x=x_6}}\left\{\left.\frac{d^2y}{dx^2}\right|_{x=x_6}\dot{x}^3\Big|_{x=x_6}\right. \tag{23}$$
$$\left. -20(\dot{x}|_{x=x_6}y_6 - \dot{y}|_{x=x_6}x_6) + 40(\dot{x}|_{x=x_6}y_5 - \dot{y}|_{x=x_6}x_5)\right\}$$

The formula (23) shows that, in FIG. 3, the control point $X_4$ must lie on a straight line $LP_6$ that is parallel to the pressure surface tangent $LT_6$.

Finally, the continuity condition for the third order differential coefficient (boundary condition (3)) will be examined.

The third order differential coefficient is expressed by the following formula.

$$\frac{d^2y}{dx^2} = \frac{\ddot{x}\dot{y} - \dot{x}\ddot{y}}{\dot{x}^3}$$

$$\frac{d^3y}{dx^3} = \frac{d}{dt}\left(\frac{d^2y}{dx^2}\right)\frac{dt}{dx} = \frac{d}{dt}\left(\frac{\ddot{x}\dot{y} - \dot{x}\ddot{y}}{\dot{x}^3}\right)\dot{x} \tag{24}$$
$$= \frac{\{\dot{x}^2\dddot{y} - 3\dot{x}\ddot{x}\ddot{y} + (3\ddot{x}^2 - \dddot{x}\dot{x})\dot{y}\}}{\dot{x}^5}$$

Equations that have to be satisfied at the end point $X_1$ on the suction surface curve CS are as follows.

$$f(x_3, x_4) = \left.\frac{d^3y}{dx^3}\right|_{x=x_1} - \left.\frac{\{\dot{x}^2\dddot{y} - 3\dot{x}\ddot{x}\ddot{y} + (3\ddot{x}^2 - \dddot{x}\dot{x})\dot{y}\}}{\dot{x}^5}\right|_{x=x_1} \tag{25}$$

$$\dot{x}|_{x=x_1} = -5x_2 + 5x_1 \tag{26}$$

$$\dot{y}|_{x=x_1} = -5y_2 + 5y_1 \tag{27}$$

$$\ddot{x}|_{x=x_1} = 20x_3 - 40x_2 + 20x_1 \tag{28}$$

$$\ddot{y}|_{x=x_1} = 20y_3 - 40y_2 + 20y_1 \tag{29}$$

$$\dddot{x}|_{x=x_1} = -60x_4 + 180x_3 - 180x_2 + 60x_1 \tag{30}$$

$$\dddot{y}|_{x=x_1} = -60y_4 + 180y_3 - 180y_2 + 60y_1 \tag{31}$$

On the other hand, equations that have to be satisfied at the end point $X_6$ on the pressure surface curve CP are as follows.

$$g(x_3, x_4) = \left.\frac{d^3y}{dx^3}\right|_{x=x_6} - \left.\frac{\{\dot{x}^2\dddot{y} - 3\dot{x}\ddot{x}\ddot{y} + (3\ddot{x}^2 - \dddot{x}\dot{x})\dot{y}\}}{\dot{x}^5}\right|_{x=x_6} \tag{32}$$

$$\dot{x}|_{x=x_6} = -5x_5 + 5x_6 \tag{33}$$

$$\dot{y}|_{x=x_6} = -5y_5 + 5y_6 \tag{34}$$

$$\ddot{x}|_{x=x_6} = 20x_4 - 40x_5 + 20x_6 \tag{35}$$

$$\ddot{y}|_{x=x_6} = 20y_4 - 40y_5 + 20y_6 \tag{36}$$

$$\dddot{x}|_{x=x_6} = -60x_3 + 180x_4 - 180x_5 + 60x_6 \tag{37}$$

$$\dddot{y}|_{x=x_6} = -60y_3 + 180y_4 - 180y_5 + 60y_6 \tag{38}$$

If the coordinates of the control point $X_2$ and $X_5$ are regarded as constants since the coordinates depend on the parameters p and q, the remaining unknown quantities are only the X coordinates of the control points $X_3$ and $X_4$, so that the simultaneous equations including the formulas (25) and (32) can be solved.

Figure 7:
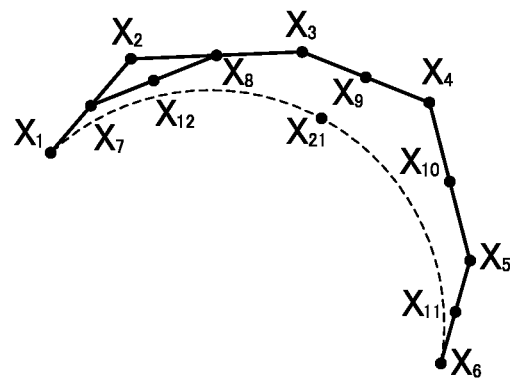
FIG. 7 is a diagram for illustrating a method of drawing a fifth order Bezier curve.

Once all the control points $X_1$, $X_2$, $X_3$, $X_4$, $X_5$ and $X_6$ are determined as described above, one Bezier curve, that is, the leading edge curve CL can be drawn in the method described earlier with reference to FIG. 7.

However, the parameters p and q are not determined yet. Therefore, Bezier curves of various shapes, that is, leading edge curves CL of various shapes can be drawn by changing the parameters p and q between 0 and 1. In designing the airfoil, the airfoil can be optimized by individually evaluating the aerodynamic performance of the blades having the leading edge curves CL of the various shapes determined as described above.

Here, summarizing the method of designing the airfoil A of the blade according to the embodiment of the present disclosure described above, the method includes the following steps.

(A) A step of determining a pressure surface curve CP as a curve capable of first to third order differentiations at a pressure surface connection point TP.

(B) A step of determining a suction surface curve CS as a curve capable of first to third order differentiations at a suction surface connection point TS.

(C) A step of selecting a first control point $X_1$, a second control point $X_2$, a third control point $X_3$, a fourth control point $X_4$, a fifth control point $X_5$ and a sixth control point $X_6$ that define a fifth order Bezier curve forming a leading edge curve CL. The step (C) includes the following sub-steps.

(C-1) A sub-step of designating the suction surface connection point TS as the first control point $X_1$.

(C-2) A sub-step of designating the pressure surface connection point TP as the sixth control point $X_6$.

Provided that an intersection of a tangent to the pressure surface curve CP at the pressure surface connection point TP and a tangent to the suction surface curve CS at the suction surface connection point TS is referred to as a point $X_0$ ahead of a blade, the step (C) further includes the following sub-steps.

(C-3) A sub-step of designating, as the second control point $X_2$, a point that internally divides a line segment connecting the point $X_0$ ahead of the blade and the suction surface connection point TS with a ratio of p to (1−p) (where 0<p<1).

(C-4) A sub-step of designating, as the fifth control point $X_5$, a point that internally divides a line segment connecting the point $X_0$ ahead of the blade and the pressure surface connection point TP with a ratio of q to (1−q) (where 0<q<1).

(C-5) A sub-step of designating, as the third control point $X_3$ and the fourth control point $X_4$, points having coordinates that are determined as solutions of simultaneous equations obtained by applying continuity conditions for first to third differential coefficients at the first control point $X_1$ and the sixth control point $X_6$ to a fifth order Bezier function that defines the fifth order Bezier curve.

The shape of the airfoil A of the blade according to the embodiment of the present disclosure described above can be summarized as follows.

A pressure surface curve CP is a curve whose first to third order differential coefficients at a pressure surface connection point TP are known.

A suction surface curve CS is a curve whose first to third order differential coefficients at a suction surface connection point TS are known.

A leading edge curve CL is formed as a fifth order Bezier curve that is defined by a first control point $X_1$, a second control point $X_2$, a third control point $X_3$, a fourth control point $X_4$, a fifth control point $X_5$ and a sixth control point $X_6$.

The first control point $X_1$ coincides with the suction surface connection point TS.

The sixth control point $X_6$ coincides with the pressure surface connection point TP.

Provided that an intersection of a tangent to the suction surface curve CS at the first control point $X_1$ and a tangent to the pressure surface curve CP at the sixth control point $X_6$ is referred to as a point $X_0$ ahead of a blade, the second control point $X_2$ is a point that internally divides a line segment $X_0X_1$ with a ratio of (1−p) to p (where 0<p<1).

The fifth control point $X_5$ is a point that internally divides a line segment $X_0X_6$ with a ratio of (1−q) to q (where 0<q<1).

The third control point $X_3$ and the fourth control point $X_4$ are points having coordinates that are determined as solutions of simultaneous equations (formulas (25) and (32)) obtained by applying continuity conditions for first to third differential coefficients at the first control point $X_1$ and the sixth control point $X_6$ to a fifth order Bezier function that defines the fifth order Bezier curve.

As described above, with the airfoil A of the blade according to the embodiment of the present disclosure, since the Bezier curve adopted as the leading edge curve CL is defined so that the first to third order differential coefficients thereof are continuous at the pressure surface connection point TP and the suction surface connection point TS, the radius of curvature of the blade surface is continuous at the connection points, and the aerodynamic performance of the blade is improved.

With the airfoil A of the blade according to the embodiment of the present disclosure, the order of the Bezier curve adopted as the leading edge curve CL is the fifth order. However, by applying the continuity conditions for the first to third differential coefficients described above, the number of unknown quantities is significantly reduced, and the control points of the Bezier curve can be determined using only two variables (p and q). Therefore, compared with the case where control points selected by trial and error are used, that is, where eight unknown quantities (the x coordinate and the y coordinate of the four control points other than the control points at the opposite ends) are handled, a Bezier curve having a desired shape can be quickly determined, and the design productivity can be improved. In addition, since the two variables (p and q) remain as unknown quantities, the degree of freedom of the design of the airfoil is ensured.

Next, effects and advantages of the blade according to the embodiment of the present disclosure will be described below.

Figure 4A:
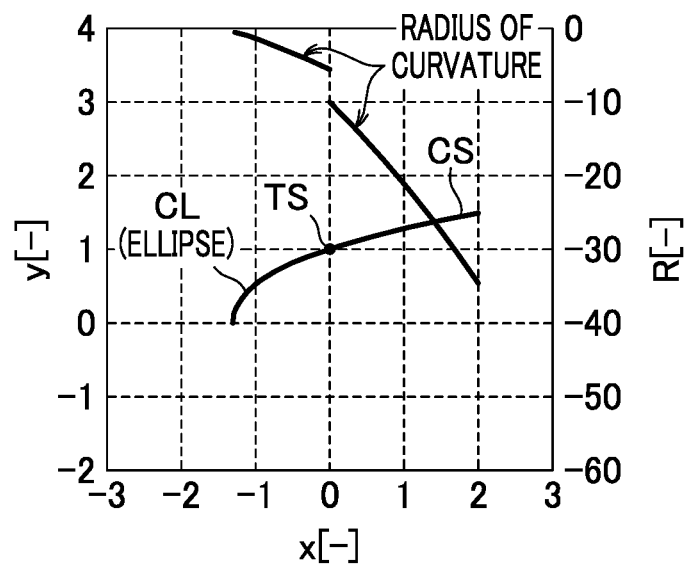
FIG. 4A is a graph showing a shape of a part of a conventional airfoil including a leading edge and a distribution of the radius of curvature of a blade surface.
Figure 4B:
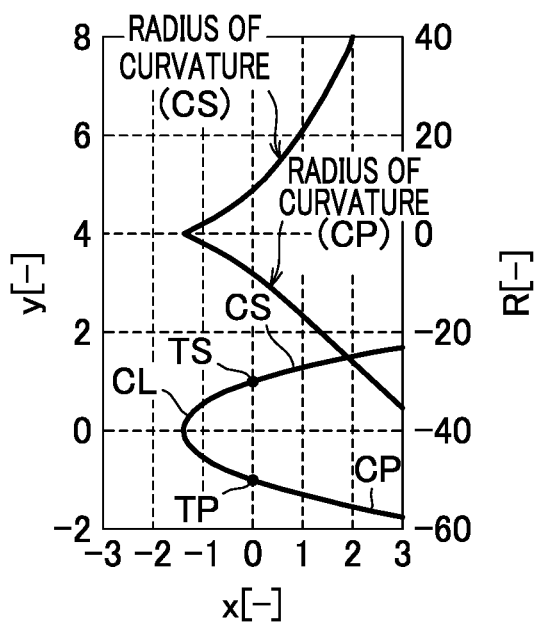
FIG. 4B is a graph showing a shape of a part of the airfoil of the blade including the leading edge and a distribution of the radius of curvature of the blade surface of the present disclosure.

FIGS. 4A and 4B are graphs showing shapes of a part of the airfoil including the leading edge and distributions of the radius of curvature of the blade surface. FIG. 4A shows a conventional airfoil, and FIG. 4B shows the airfoil A of the blade according to the embodiment of the present disclosure. In each graph, the horizontal axis indicates the coordinate x in the chord direction, the vertical axis (left) indicates the blade thickness y, and the vertical axis (right) indicates the radius of curvature R. FIG. 4A shows only the suction surface of the conventional airfoil, and FIG. 4B shows both the pressure surface and the suction surface of the airfoil A.

As shown in FIG. 4A, with the conventional airfoil whose leading edge curve CL is elliptic, the radius of curvature of the blade surface is discontinuous at a location (x=0) in the chord direction that corresponds to the connection point (suction surface connection point TS) between the leading edge curve CL and the suction surface curve CS.

To the contrary, with the airfoil A of the blade according to the embodiment of the present disclosure, as shown in FIG. 4B, it is found that the radius of curvature of the blade surface is continuous at the locations (x=0) in the chord direction that correspond to the suction surface connection point TS and the pressure surface connection point TP.

Figure 5A:
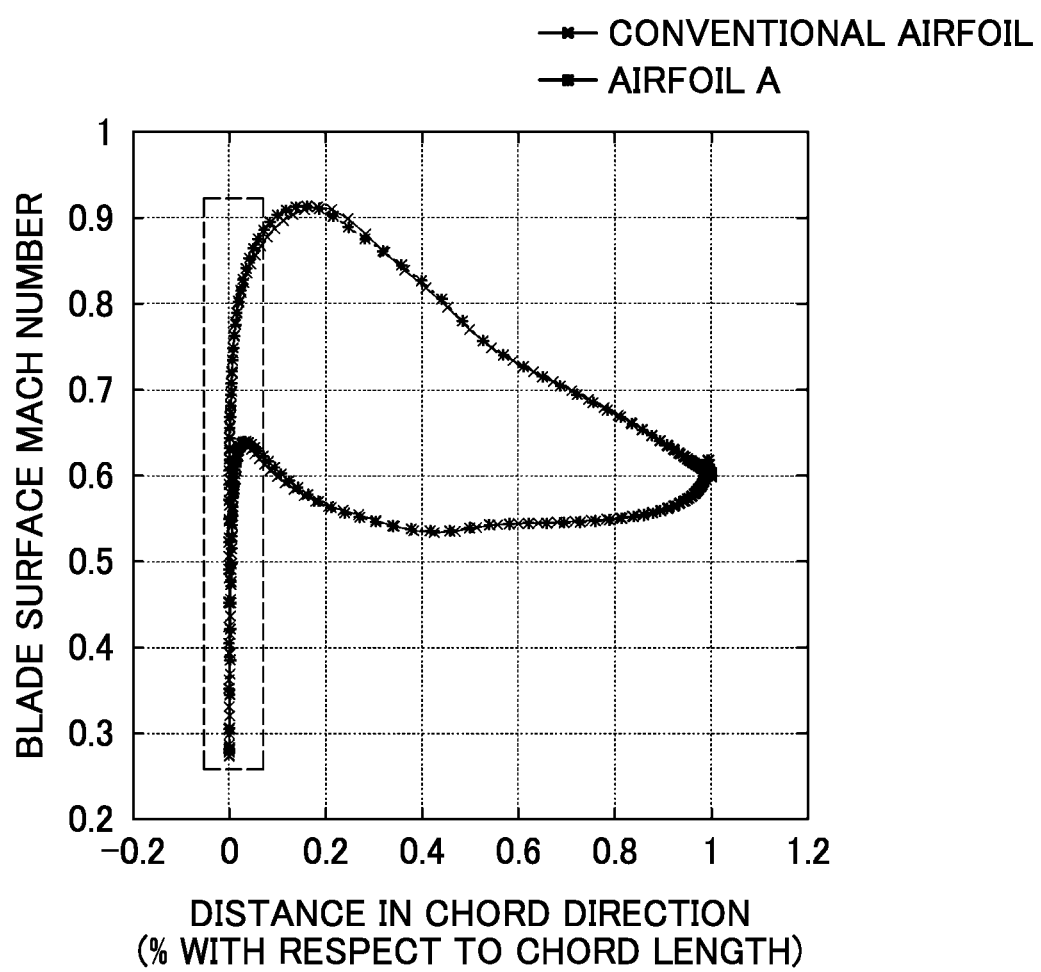
FIG. 5A is a graph showing a distribution of the blade surface Mach number at a design point in the entire region in the chord direction.
Figure 6:
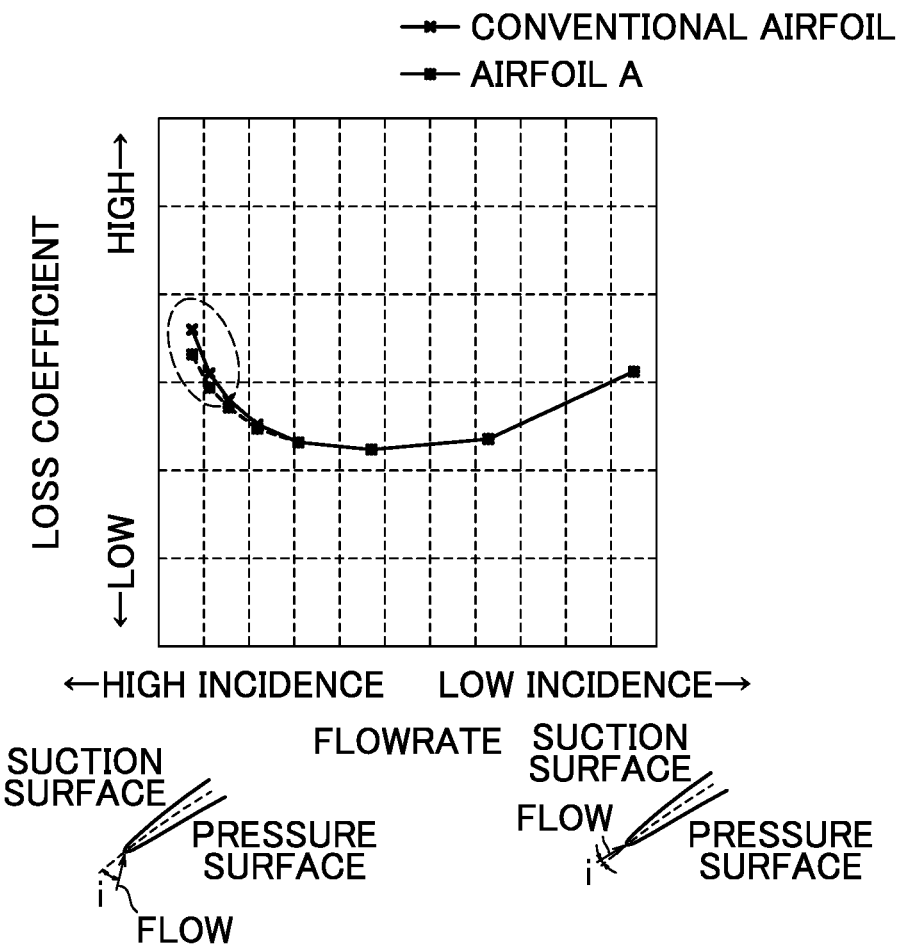
FIG. 6 is a graph showing a loss coefficient.

FIGS. 5 and 6 show results of analysis of both the airfoils using CFD and comparison of the airfoils in terms of aerodynamic performance of the blade.

FIGS. 5A and 5B are graphs showing distributions of the blade surface Mach number at a design point. FIG. 5A shows a distribution over the entire region in the chord direction, and FIG. 5B shows a distribution over a region around the leading edge (the region surrounded by the dashed line in FIG. 5A). In each graph, the horizontal axis indicates the distance in the chord direction (shown as non-dimensional numbers with respect to the chord length), the vertical axis indicates the blade surface Mach number, upper plots show a distribution on the suction surface, and lower plots show a distribution on the pressure surface.

As shown in FIG. 5A, the distributions of the blade surface Mach number for the conventional airfoil and the airfoil A of the blade according to the embodiment of the present disclosure exhibit no marked difference in the macroscopic view over the entire region in the chord direction. However, the specific view of the region around the leading edge (the region surrounded by the dashed line in FIG. 5A) in FIG. 5B shows that, in the distribution of the blade surface Mach number for the airfoil A of the blade according to the embodiment of the present disclosure, the irregularities in the distribution of the blade surface Mach number for the conventional airfoil are eliminated, and the blade surface Mach number changes smoothly.

That is, with the airfoil A of the blade according to the embodiment of the present disclosure, acceleration and deceleration of the flow over the blade surface are reduced compared with the conventional airfoil, and the fan or compressor incorporating the blades with the airfoil A is expected to have a higher efficiency and a wider stable operating range.

FIG. 6 is a graph showing a loss coefficient. The vertical axis indicates the loss coefficient (a non-dimensional index of a total pressure drop at the time of passing over the blade with respect to a dynamic pressure), and the horizontal axis indicates the flowrate (the amount of intake air of the fan or compressor incorporating the blades). The flowrate corresponds to the incidence (inflow angle) at the inlet of the blade. The incidence is low when the flowrate is high, and is high when the flowrate is low.

As shown in the drawing, it is found that when the flowrate is high (the incidence is low), no marked difference is observed. However, when the flowrate is low (the incidence is high), the airfoil A of the blade according to the embodiment of the present disclosure provides smaller loss coefficients than the conventional airfoil.

With the conventional airfoil, the loss coefficient is high when the flowrate is low (the incidence is high), and in order to prevent occurrence of a stall, the operating range needs to be limited to a range of higher flowrates (lower incidences).

To the contrary, with the airfoil A of the blade according to the embodiment of the present disclosure, the loss coefficient is low even when the flowrate is low (the incidence is high), so that the operating range does not need to be limited to a range of higher flowrates (lower incidences). That is, the fan or compressor incorporating the blades according to the embodiment of the present disclosure can have a stable operating range expanded to lower flowrates compared with the fan or compressor incorporating the blades with the conventional airfoil.

Although the airfoil only the leading edge curve of which is formed as a Bezier curve has been described above, not only the leading edge curve but also the trailing edge curve can be formed as a Bezier curve.

Although the blade according to the present disclosure is particularly advantageous when the blade is used as a rotor blade or stator vane of a fan or compressor of a turbo-fan engine of an aircraft which has a high blade surface Mach number and experiences a significant change in incidence (inflow angle) during operation, the application of the blade is not limited thereto. The blade according to the present disclosure can be widely used as a rotor blade or stator vane of an axial flow fluid machine, such as a compressor of a gas turbine other than the turbo-fan engine for an aircraft, or a fan, a compressor or a turbine as a stand-alone device.

EXPLANATION OF REFERENCE SIGNS

A airfoil
LE leading edge
CL leading edge curve
TE trailing edge
CT trailing edge curve
PS pressure surface
CP pressure surface curve
SS suction surface
CS suction surface curve
TP pressure surface connection point
TS suction surface connection point
X0 point ahead of blade
X1 first control point
X2 second control point
X3 third control point
X4 fourth control point
X5 fifth control point
X6 sixth control point

The invention claimed is:
1. A blade having an airfoil that is formed by a leading edge curve, a trailing edge curve, a pressure surface curve and a suction surface curve,
wherein the pressure surface curve is a curve that is connected to the leading edge curve at a pressure surface connection point and whose first to third order differential coefficients at the pressure surface connection point are known,
the suction surface curve is a curve that is connected to the leading edge curve at a suction surface connection point and whose first to third order differential coefficients at the suction surface connection point are known;
the leading edge curve is formed as a fifth order Bezier curve,
the fifth order Bezier curve is defined by a first control point, a second control point, a third control point, a fourth control point, a fifth control point and a sixth control point,
the first control point coincides with the suction surface connection point,
the sixth control point coincides with the pressure surface connection point,
provided that an intersection of a tangent to the pressure surface curve at the pressure surface connection point and a tangent to the suction surface curve at the suction surface connection point is referred to as a point ahead of the blade,
the second control point is a point that internally divides a line segment connecting the point ahead of the blade and the suction surface connection point with a ratio of p to (1−p) (where 0<p<1),
the fifth control point is a point that internally divides a line segment connecting the point ahead of the blade and the pressure surface connection point with a ratio of q to (1−q) (where 0<q<1), and
the third control point and the fourth control point are points having coordinates that are determined as solutions of simultaneous equations obtained by applying continuity conditions for first to third differential coefficients at the first control point and the sixth control point to a fifth order Bezier function that defines the fifth order Bezier curve.

* * * * *